United States Patent
Fujiwara et al.

(10) Patent No.: US 7,702,486 B2
(45) Date of Patent: Apr. 20, 2010

(54) APPARATUS AND METHOD FOR MANAGING LIQUID CRYSTAL SUBSTRATE

(75) Inventors: Tadayuki Fujiwara, Hachioji (JP); Chikuya Takada, Tokyo (JP)

(73) Assignee: Shimadzu Corporation, Kyoto-shi (JP)

( * ) Notice: Subject to any disclaimer, the term of this patent is extended or adjusted under 35 U.S.C. 154(b) by 1253 days.

(21) Appl. No.: 10/783,057

(22) Filed: Feb. 20, 2004

(65) Prior Publication Data
US 2004/0164762 A1 Aug. 26, 2004

(30) Foreign Application Priority Data
Feb. 25, 2003 (JP) ............... 2003-047884

(51) Int. Cl.
G06F 11/30 (2006.01)
G21C 17/00 (2006.01)
G06F 19/00 (2006.01)

(52) U.S. Cl. .............. 702/185; 702/117; 702/183; 700/110

(58) Field of Classification Search ............... 702/117, 702/183, 185; 700/110
See application file for complete search history.

(56) References Cited

U.S. PATENT DOCUMENTS

| 4,847,795 | A * | 7/1989 | Baker et al. ............ 702/184 |
| 5,351,247 | A * | 9/1994 | Dow et al. ............... 714/26 |
| 6,269,279 | B1 * | 7/2001 | Todate et al. ............ 700/121 |
| 6,282,457 | B1 * | 8/2001 | Miura et al. ............. 700/121 |
| 6,438,438 | B1 * | 8/2002 | Takagi et al. ............ 700/121 |
| 6,473,664 | B1 * | 10/2002 | Lee et al. ................ 700/110 |
| 6,629,051 | B2 | 9/2003 | Tanaka |
| 7,133,807 | B2 * | 11/2006 | Karasawa ................ 702/188 |
| 2001/0020194 | A1 * | 9/2001 | Takagi et al. ............ 700/109 |
| 2003/0063792 | A1 * | 4/2003 | Hiroi et al. .............. 382/149 |
| 2004/0101981 | A1 | 5/2004 | Morishita |

FOREIGN PATENT DOCUMENTS

| JP | 6-082801 | 3/1994 |
| JP | 08-292008 | 11/1996 |
| JP | 10-177844 | 6/1998 |
| JP | 2000-206480 | 7/2000 |
| JP | 2001-035893 | 2/2001 |
| JP | 2001-296510 | 10/2001 |
| JP | 2001-337047 | 12/2001 |
| JP | 2001-343907 | 12/2001 |
| KR | A-2001-0101550 | 11/2001 |
| TW | 518652 | 1/2003 |

* cited by examiner

Primary Examiner—Eliseo Ramos Feliciano
Assistant Examiner—Janet L Suglo
(74) Attorney, Agent, or Firm—Rankin, Hill & Clark LLP

(57) ABSTRACT

A liquid crystal substrate managing apparatus comprises a data management section with a database for recording a defect information acquired from a liquid crystal testing device, and an image information and a repair information acquired from a liquid crystal repair device. The data management section performs the reidentification of a defect and/or the redetermination of a panel and/or a substrate based on the defect information, the image information and the repair information recorded in the database.

12 Claims, 4 Drawing Sheets

US 7,702,486 B2

APPARATUS AND METHOD FOR MANAGING LIQUID CRYSTAL SUBSTRATE

BACKGROUND OF THE INVENTION

1. Field of the Invention

The present invention relates to an apparatus and a method for managing a liquid crystal substrate for use in a liquid crystal display or an organic EL display, and more particularly to management of a liquid crystal substrate on the production line of liquid crystal substrates.

2. Description of the Related Art

On the production line including various processes, a liquid crystal substrate is tested for defects by a liquid crystal testing device, and repaired by a liquid crystal repair device based on the defect information detected by the liquid crystal testing device. On the production line, the liquid crystal substrate is usually provided with a plurality of panels on a glass substrate, each panel being formed with a plurality of TFT arrays.

The liquid crystal testing device tests the liquid crystal substrate for defects, for example, by inspecting a gate or a source provided on each of the plurality of TFT arrays for a gate-source short circuit, a point defect or a disconnection, thereby making determination of whether or not each panel or substrate is defective. The liquid crystal repair device repairs the defect of the liquid crystal substrate based on the detect information acquired by the liquid crystal testing device.

The detect information is simply exchanged between the liquid crystal testing device and the liquid crystal repair device. However, the liquid crystal substrate is not managed, regarding how the detect information acquired by the liquid crystal testing device is reflected to the liquid crystal repair device, or what defects occur on the production line of the liquid crystal substrate.

In addition, the recipes including the number of panels arranged on the substrate and their arrangement and the size of pixel on each panel are set for each liquid crystal substrate. The liquid crystal testing device or the liquid crystal repair device needs to test or repair the liquid crystal substrate based on the recipe information. In the related art, this recipe information is managed for each liquid crystal testing device or liquid crystal repair device, whereby each device is required to make the settings for every recipe information.

In the related art management of the liquid crystal substrate, the information acquired by each processing device or the recipe information is managed by individual device on the production line including a testing process and a repair process. Therefore, when a liquid crystal substrate managing apparatus performs identification of the defect or determination whether the substrate or panel is defective or not several times, it is difficult to make a redetermination by comparison with the determination in the previous process. In addition, since the determination precision depends on that of each device, the liquid crystal substrate managing apparatus is not expected to have higher determination precision unless the determination precision of each device is enhanced.

Also, since the information common to each device such as the recipe information and the defect information are managed by each of the liquid crystal testing device and the liquid crystal repair device, there is a problem that it is inefficient in the information management and it is difficult to manage a trend information of defects over the liquid crystal substrate management.

SUMMARY OF THE INVENTION

It is an object of the invention to provide an apparatus and a method for managing a liquid crystal substrate which can make a reidentification of the defect and a redetermination of a panel or substrate. It is another object of the invention to enhance the determination precision in the liquid crystal substrate. It is a further object to manage a trend information of defect, and manage a recipe information centrally.

This invention provides a liquid crystal substrate managing apparatus capable of making a reidentification of the defect and a redetermination of a panel or substrate by recording a defect information acquired from a liquid crystal testing device and an image information acquired from a liquid crystal repair device in a common recording section as a database, whereby the determination precision of the liquid crystal substrate is enhanced and a trend information of the defect can be managed.

Therefore, the liquid crystal substrate managing apparatus of the invention comprises a data management section having a database for recording the defect information acquired from the liquid crystal testing device and the image information and the repair information acquired from the liquid crystal repair device.

The liquid crystal testing device identifies the detect with the acquired defect information, and determines whether the panel or substrate is defective or not and the possibility of repair, based on the detect. The liquid crystal repair device repairs the liquid crystal substrate based on this defect information.

The data management section records the defect information acquired by the liquid crystal testing device, and the image information and repair information acquired by the liquid crystal repair device in the database. Using the defect information, the image information and the repair information recorded in the database, the reidentification of the defect and the redetermination of the panel or substrate are made for the identification of the defect and determination of the panel or substrate acquired by the liquid crystal testing. By making the redetermination, plural determination processes are performed for the same defect, thereby enhancing the determination precision in the liquid crystal substrate.

Also, the database stores the defect information, the image information and the repair information for a plurality of liquid crystal substrates, whereby the trend information is acquired by making the information processing such as statistical processing for the defect information, image information and repair information.

In addition, the data management section comprises the recipe information for defining the specifications of the substrate and the panel, where by the recipe information is edited freely and managed centrally. By managing the recipe information centrally, the each device can dispense with a processing for storing and managing the recipe information individually.

The data management section exchanges information with a terminal connecting thereto, in which the recipe information is edited at the terminal, and recorded and stored in the database again.

DETAILED DESCRIPTION OF THE INVENTION

The preferred embodiments of the present invention will be described below in detail with reference to the accompanying drawings.

Figure 1:
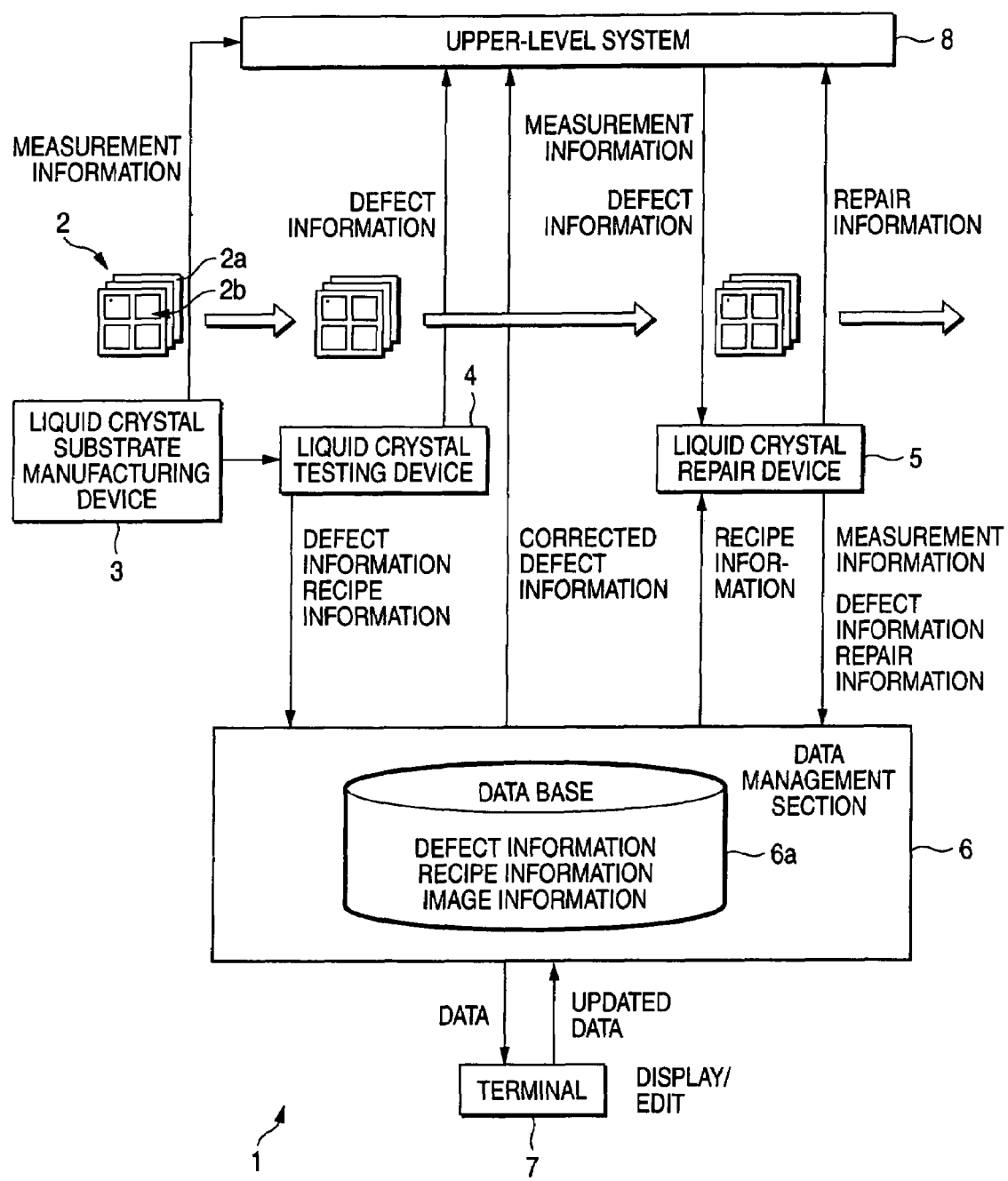
FIG. 1 is a schematic view for explaining a liquid crystal substrate managing apparatus according to the present invention.

FIG. 1 is a schematic view for explaining a liquid crystal substrate managing apparatus according to the invention.

On the production line of a liquid crystal substrate 2, there are provided a liquid crystal substrate manufacturing device 3 with various processing units corresponding to the manufacturing processes, a liquid crystal testing device 4 for making the defect testing for the formed liquid crystal substrate 2, and a liquid crystal repair device 5 for repairing the liquid crystal substrate 2 based on the testing result of defect. A liquid crystal substrate managing apparatus 1 of the invention comprises a data management section 6, in which information acquired by the liquid crystal testing device 4 or the liquid crystal repair device 5 is input into a database 6a provided for the data management section 6.

The liquid crystal substrate manufacturing device 3 manufactures the liquid crystal substrate 2 by forming a TFT array on a panel 2b on the substrate 2 such as a glass substrate.

The liquid crystal testing device 4 tests a defect of the liquid crystal substrate 2 produced by the liquid crystal substrate manufacturing device 3 on the production line to acquire a defect information. The defect information may include, for example, defect position, defect state such as short circuit or disconnection, line, point or raster defect form, whether the panel or substrate is defective or not, and various kinds of information including determination result such as reproducible. The defect information acquired upon the defect testing by the liquid crystal testing device 4, together with an ID information such as a lot ID designating the manufacturing process of each liquid crystal substrate 2 and a substrate ID designating each substrate, a recipe information representing specifications of each liquid crystal substrate 2, and a waveform data (e.g., 20-point data), is sent to the data management section 6, and recorded and stored in the database 6a.

In addition, the defect information is sent from the liquid crystal testing device 4 to an upper-level system 8, which is a system at the upper level for making production management for the liquid crystal substrate. Various kinds of information is sent from the various processing units of the liquid crystal substrate manufacturing device 3 installed on the production line to this upper-level system 8. The user makes access to the upper-level system 8 to refer to the defect information of each liquid crystal substrate.

The liquid crystal repair device 5 receives the defect information acquired by the liquid crystal testing device 4 or other various information from the upper-level system 8, and repairs a defective portion based on the defect information. At this time, when the defect information contains an error to make the defect position or defect kind indicated by the defect information erroneous, the liquid crystal repair device 5 corrects the defect information.

The liquid crystal repair device 5 sends a repair information including a defect repaired information or a corrected defect information to the data management section 6, and acquires an image information of the liquid crystal substrate 2 and sends it to the data management section 6. The data management section 6 receives the repair information including the defect repaired information and the corrected defect information, and the image information, which are sent from the liquid crystal repair device 5, and records and stores them in the database 6a. The liquid crystal repair device 5 sends the repair information including the defect repaired information and the corrected defect information to the upper-level system 8 as well.

Accordingly, the data management section 6 records and stores the defect information, the recipe information and the waveform data sent from the liquid crystal testing device 4, as well as the repair information and the image information sent from the liquid crystal repair device 5, in the database 6a.

The data management section 6 manages the storage of various kinds of information and data in the database 6a, and performs the reidentification of detect and the redetermination of the panel or substrate, and the correction or edit of information and data.

The reidentification of defect involves identifying the defect position and the defect kind again by making a comparison between the defect information acquired from the liquid crystal testing device and the repair information acquired from the liquid crystal repair device. In the reidentification, if the repair information contains the corrected position data or corrected defect kind information, the first defect information is corrected and updated.

The redetermination of the substrate or panel involves determining again whether or not the substrate or panel is defective based on the repair information acquired from the liquid crystal repair device. The precision of defect determination is enhanced using two results of determination including the redetermination result and the determination result acquired from the liquid crystal testing device.

The correction of the data is made by correcting the defect information sent and saved from the liquid crystal testing device 4 based on the corrected defect information sent from the liquid crystal repair device 5. For example, when the defect position, the defect state such as short circuit or disconnection, and the line, point or raster defect form of the defect portion saved based on the defect information sent from the liquid crystal testing device 4 is different from those of the repair information sent from the liquid crystal repair device 5, the data management section 6 corrects the saved defect information based on the repair information, and stores the corrected defect information in the database 6a. The corrected defect information is also sent to the upper-level system 8.

The edit of data involves editing the defect information sent and saved from the liquid crystal testing device 4 based on the defect repaired information, the corrected defect information, and the image information sent from the liquid crystal repair device 5. In this edit, the defect repaired information, the corrected defect information and the image information sent from the liquid crystal repair device may be displayed on a terminal 7, whereby the defect information such as kind of defect and determination result may be edited on the terminal 7.

The data management section 6 sends the recipe information of the liquid crystal substrate sent and saved from the liquid crystal testing device 4 to the liquid crystal repair device 5, and the liquid crystal repair device 5 repairs the liquid crystal substrate based on this recipe information.

The data management section 6 may edit this recipe information. Editing of this recipe information may be made by displaying an edit screen on the terminal 7, and the edited recipe information may be stored in the database 6a.

Referring to FIG. 2, the defect information acquired by the liquid crystal testing device and the repair information acquired by the liquid crystal repair device will be described below. Though in an example as shown in FIG. 2, the liquid crystal substrate 2 is provided with four panels 2b1 to 2b4 on the substrate 2a, the number of panels is not limited to four but may be set arbitrarily.

Figure 2A:
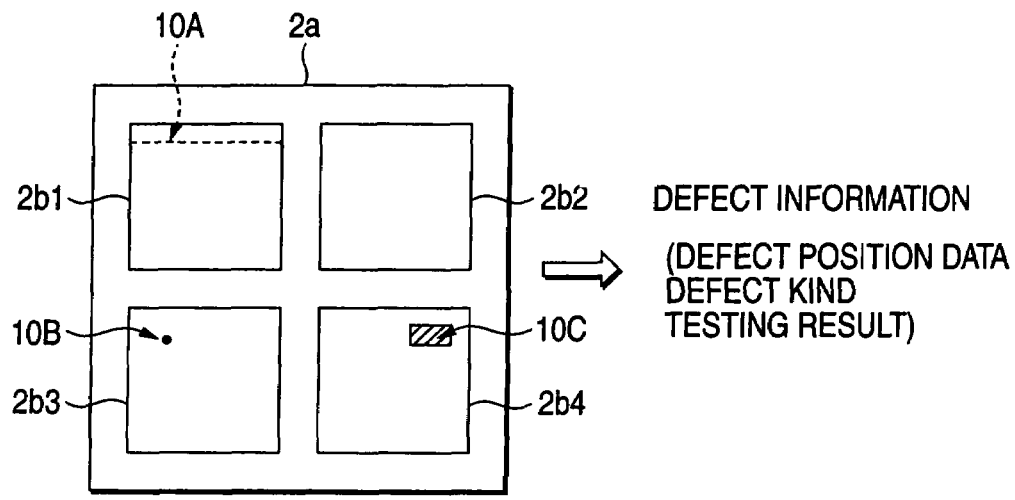
FIGS. 2A and 2B are diagrams for explaining a defect information acquired by a liquid crystal testing device and a repair information acquired by a liquid crystal repair device.

FIG. 2A is a diagram for explaining the defect information acquired by the liquid crystal testing device. In the panels 2b1 to 2b4, for example, a defect 10A of panel 2b1 is an example of line defect appearing along the gate line or source line on the panel, a defect 10B of panel 2b3 is an example of point defect appearing at each pixel, and a defect 10C of panel 2b4 is an example of raster defect appearing as an aggregate of plural pixels.

The liquid crystal testing device detects each defect 10A to 10C, and acquires the defect position, defect kind and testing result. The defect kind may be, for example, defect state such as short circuit or disconnection, or line, point and raster defect form. In addition, the testing result may be whether the panel or substrate is non-defective (OK) or not (NG) depending on the extent of defect and the number of defects, or the possibility of repair. For example, if the extent of defect for the panel is repaired by the liquid crystal repair device, the panel is determined to be repairable. Or if the number of defective panels on the substrate is larger than the number of non-defective panels, the substrate is determined to be defective. The determination criteria for the panel and substrate may be arbitrarily determined by the user.

Figure 2B:
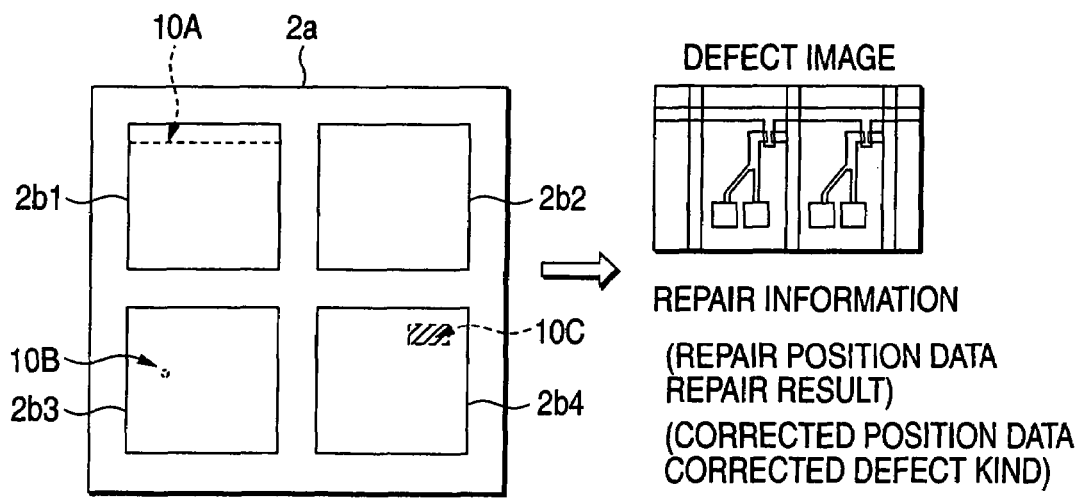

FIG. 2B is a diagram showing the image information and repair information acquired by the liquid crystal repair device. Herein, it is assumed that the liquid crystal repair device repairs the liquid crystal substrate as shown in FIG. 2A, in which the position of defect 10B on the panel 2b3 is different from that in FIG. 2A.

The liquid crystal repair device repairs the defect 10A of panel 2b1, the defect 10B of panel 2b3, and the defect 10C of panel 2b4 based on the defect information acquired by the liquid crystal testing device. In FIG. 2B, the repaired defect is indicated by the broken line. At the time of repair, the defect position or defect kind may be different from the defect information. In this case, the defect position or defect kind is corrected to produce the corrected defect information.

The liquid crystal repair device acquires the image information of the liquid crystal substrate after repairing the defect, and sends the acquired image information, together with the defect repaired information and the corrected defect information, to the data management section.

Figure 3:
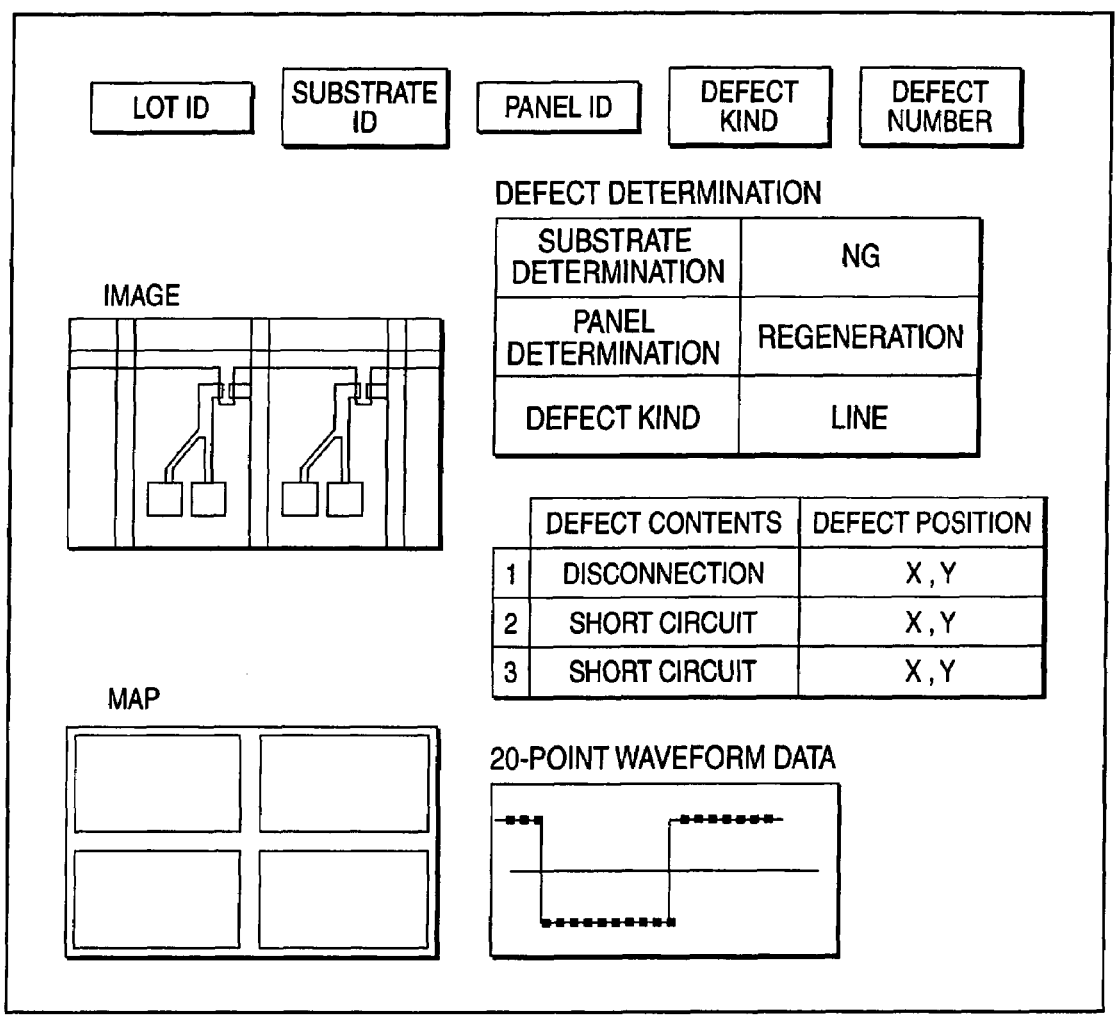
FIG. 3 is a display example of the defect information and an image information saved in a data management section.

Here, in the present invention, it is important to send or receive the data including the image information, via the database 6a, from the liquid crystal testing device 4 to the liquid crystal repair device 5 or from the liquid crystal repair device 5 to the liquid crystal testing device 4. FIG. 3 is a display example of the defect information and image information saved in the data management section. The terminal 7 reads the defect information and the image information saved in the database 6a of the data management section 6 and displays them on a display screen. In the display example as shown in FIG. 3, the results of panel determination and substrate determination, as well as the defect kind, defect content and defect position are displayed based on the defect information. Furthermore, the image information acquired by the liquid crystal repair device and the 20-point waveform data acquired by the liquid crystal testing device may be displayed. Furthermore, the defect distributed state may be displayed as a map based on the defect information. FIG. 3 illustrates only one display example, but various statistical processing results may be displayed using the defect information on the data management section.

The 20-point waveform data is the waveform data of a measurement signal acquired by the liquid crystal testing device, in which the number of data points is not limited to 20, but may be arbitrarily set.

The data management section 6 displays the defect information or image information saved in the database 6a, or the processing result acquired by performing various statistical processings based on the defect information, and sets up or updates the recipe information of the liquid crystal substrate, as above described. When the statistical processings are performed based on the defect information, the lot ID or substrate ID set for each substrate may be referenced, and the trend information of defect such as the lot during the production process of the liquid crystal substrate, or the defect occurrence frequency or defect kind in each production process may be acquired.

Referring now to FIG. 4, setting and updating the recipe information of the liquid crystal substrate will be described. The recipe information involves the size of substrate, the central position and the alignment position set on the substrate, the number and arrangement of panels set on the substrate, the number of pixels of each panel and the pixel pitch, and may be set up for each liquid crystal substrate.

Figure 4A:
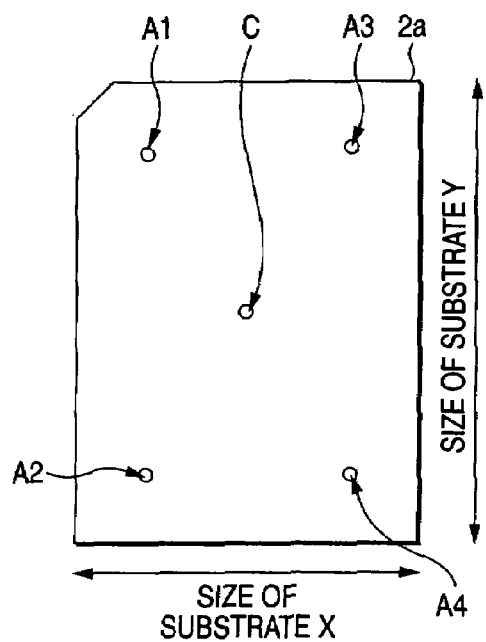
FIGS. 4A-4C are views for explaining a recipe information of a liquid crystal substrate.

FIG. 4A shows the size of substrate, and the central position and the alignment position set on the substrate. The size of the substrate 2a is made by setting the sizes in the X and Y directions. In addition, C denotes the central position of the substrate, and A1 to A4 denote the alignment positions used to align the substrate.

Figure 4B:
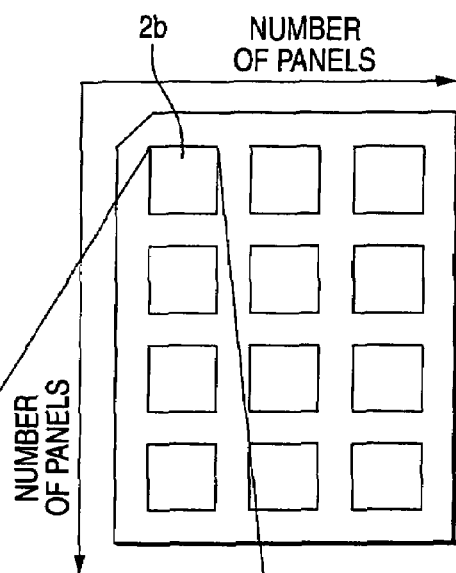

FIG. 4B shows an array of panels formed on the substrate 2a, in which the total number of panels and the arrangement of panels are determined by setting the number of panels in the transverse direction and the number of panels in the longitudinal direction.

Figure 4C:
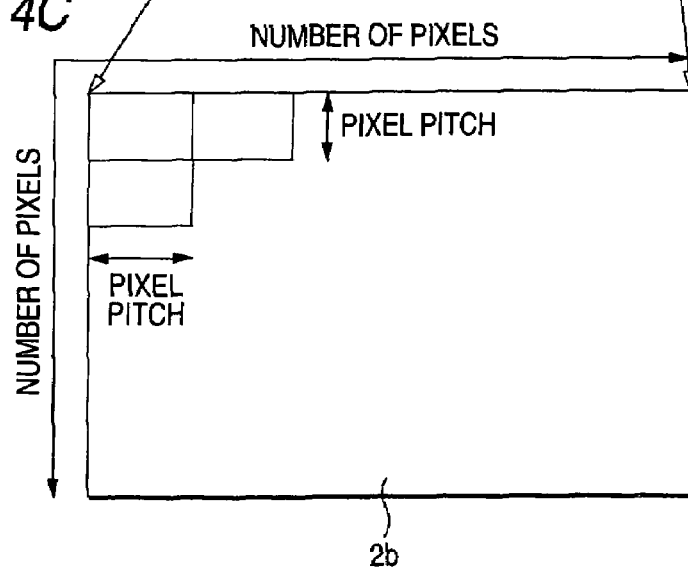

Also, FIG. 4C shows an array of pixels provided for each panel 2b, in which the total number of pixels and the arrangement of pixels are determined by setting the number of pixels in the transverse direction and the number of pixels in the longitudinal directions.

The data management section 6 sets up or updates the recipe information by editing the screen on the terminal 7. The recipe information is updated based on the substrate ID.

Thereby, the recipe information is centrally managed by the data management section 6. Owing to the central management of the recipe information, each device on the production line of the liquid crystal substrate extracts, based on the substrate ID, the recipe information set on the same substrate from the data management section 6.

As described above, with this invention, the reidentification of the defect and the redetermination of the panel or substrate can be made. Further, the determination precision in the liquid crystal substrate is enhanced, and the trend information of defect is managed. In addition, the recipe information is managed centrally.

What is claimed is:

1. An apparatus for managing a liquid crystal substrate, comprising:
    a data management section having a database;
    a liquid crystal testing device operable to determine whether at least one of a panel and a substrate in the liquid crystal substrate has a defect, and to send, to the data management section, defect information indicative of at least the defect and whether the at least one of the panel and the substrate is defective; and
    a liquid crystal repair device operable to receive the defect information from the data management section and to repair the defect based on the received defect information, the liquid crystal repair device operable to send, to the data management section, repair information that is indicative of at least a position that is actually repaired; and the liquid crystal repair device operable to correct the received defect information in a case where the received defect information contains incorrect information with regard to the defect and generate corrected defect information as a part of the repair information;

said data management section is operable to record, in the database, the defect information sent from the liquid crystal testing device and the repair information sent from the liquid crystal repair device;

said data management section is operable to redetermine the presence of the defect based on comparison between the defect information and the repair information which are recorded in said database; and said data management section is operable to update the defect information recorded in said database with the corrected defect information.

2. The liquid crystal substrate managing apparatus according to claim 1, wherein said data management section stores a recipe information for defining specifications of the substrate and panel in said database, said recipe information being edited freely.

3. The liquid crystal substrate managing apparatus according to claim 2, wherein said data management section edits the recipe information by exchange of information with a terminal connecting to the data management section.

4. The liquid crystal substrate managing apparatus according to claim 1, wherein:
the repair information includes image information of a part of the at least one of the panel and the substrate that is actually repaired.

5. The liquid crystal substrate managing apparatus according to claim 1, wherein:
said data management section is operable to acquire trend information for defects of a plurality of liquid crystal substrates, by applying statistical processing with respect to the defect information and the repair information recorded in the database.

6. The liquid crystal substrate managing apparatus according to claim 1, wherein:
the corrected defect information is generated as a part of the repair information; and
the defect information is updated when the repair information includes the corrected defect information.

7. A method for managing a liquid crystal substrate comprising:
determining with a liquid crystal testing device whether at least one of a panel and a substrate in the liquid crystal substrate has a defect;
receiving, from the liquid crystal testing device, defect information indicative of at least the defect and whether the at least one of the panel and the substrate is defective;
receiving with a liquid crystal repair device the defect information from a database, to repair the defect based on the received defect information;
receiving, from the liquid crystal repair device, repair information indicative of at least a position that is actually repaired;
correcting with the liquid crystal repair device the received defect information in a case where the received defect information contains incorrect information with regard to the defect, and to generate corrected defect information as a part of the repair information;

redetermining with a data management section the presence of the defect based on comparison between the defect information and the repair information which are recorded in the database; and updating the defect information recorded in said database with the corrected defect information.

8. The liquid crystal substrate managing method according to claim 7, further comprising:
recording a recipe information acquired from the liquid crystal testing device in the database, the recipe information defining specifications of the substrate and panel and being edited freely.

9. The method for managing a liquid crystal substrate according to claim 7, wherein:
the repair information includes image information of a part of the at least one of the panel and the substrate that is actually repaired.

10. The method for managing a liquid crystal substrate according to claim 7, further comprising:
acquiring trend information for defects of a plurality of liquid crystal substrates, by applying statistical processing with respect to the defect information and the repair information recorded in the database.

11. The method for managing a liquid crystal substrate according to claim 7, wherein:
the corrected defect information is generated as a part of the repair information; and
the defect information is updated when the repair information includes the corrected defect information.

12. An apparatus for managing a liquid crystal substrate comprising:
a data management section having a database;
a liquid crystal testing device operable to determine whether at least one of a panel and a substrate in the liquid crystal substrate has a defect, and to send, to the data management section, defect information indicative of at least the defect and whether the at least one of the panel and the substrate is defective; and
a liquid crystal repair device operable to receive the defect information from the data management section and to repair the defect based on the received defect information, the liquid crystal repair device operable to send, to the data management section, repair information that is indicative of at least a position that is actually repaired; and the liquid crystal repair device operable to correct the received defect information in a case where the received defect information contains incorrect information with regard to the defect and generate corrected defect information;

wherein said data management section is operable to record, in the database, the defect information sent from the liquid crystal testing device and the repair information sent from the liquid crystal repair device; and wherein said data management section is operable to update the defect information recorded in said database with the corrected defect information.

* * * * *